(12) United States Patent
Golden (10) Patent No.: US 10,520,083 B2
(45) Date of Patent: Dec. 31, 2019

(54) FOULING PREVENTION SYSTEM FOR SUBMERGED HYDRAULIC CYLINDERS

(71) Applicant: William Golden, North Fort Myers, FL (US)

(72) Inventor: William Golden, North Fort Myers, FL (US)

(*) Notice: Subject to any disclaimer, the term of this patent is extended or adjusted under 35 U.S.C. 154(b) by 0 days.

(21) Appl. No.: 16/031,420

(22) Filed: Jul. 10, 2018

(65) Prior Publication Data

US 2019/0107198 A1 Apr. 11, 2019

Related U.S. Application Data

(60) Provisional application No. 62/530,470, filed on Jul. 10, 2017.

(51) Int. Cl.
*F16J 3/04* (2006.01)
*F15B 15/14* (2006.01)
*F15B 11/16* (2006.01)
*B63C 1/00* (2006.01)

(52) U.S. Cl.
CPC .............. *F16J 3/046* (2013.01); *F15B 11/16* (2013.01); *F15B 15/14* (2013.01); *F15B 15/149* (2013.01); *F15B 15/1461* (2013.01); *B63C 1/00* (2013.01); *F15B 2211/7054* (2013.01); *F15B 2211/7107* (2013.01)

(58) Field of Classification Search
CPC .... F15B 15/14; F15B 15/1461; F15B 15/149; F16J 3/04; F16J 3/046
See application file for complete search history.

(56) References Cited

U.S. PATENT DOCUMENTS

| | | | | |
|---|---|---|---|---|
| 4,463,663 A | * | 8/1984 | Hanson, Jr. | F15B 15/1433 92/80 |
| 4,819,919 A | * | 4/1989 | Taylor | F16F 9/38 188/321.11 |
| 5,472,072 A | * | 12/1995 | Bumgarner | F16F 9/003 188/322.12 |
| 7,416,064 B2 | * | 8/2008 | Beck | F16F 9/38 188/322.12 |
| 7,823,709 B2 | * | 11/2010 | Beck | F16J 3/046 188/322.12 |
| 8,291,810 B2 | * | 10/2012 | Hey | F16J 3/046 92/87 |
| 8,683,912 B2 | * | 4/2014 | Hey | F16J 3/046 92/87 |

* cited by examiner

*Primary Examiner* — Michael Leslie
(74) *Attorney, Agent, or Firm* — William E. Noonan (57) ABSTRACT

A system for preventing fouling of submerged hydraulic cylinder actuators includes a pneumatic line communicably connected to a protective bellows element surrounding the cylinder rod of the actuator mechanism. As the cylinder rod extends from the cylinder housing of the mechanism and the bellows element expands, filtered air is drawn into the bellows element. Water and accompanying contaminants are prevented from entering the bellows and interfering with operation of the hydraulic actuator mechanism.

16 Claims, 7 Drawing Sheets

Fig. 8

FOULING PREVENTION SYSTEM FOR SUBMERGED HYDRAULIC CYLINDERS

RELATED APPLICATION

This application claims the benefit of U.S. Provisional Application Ser. No. 62/530,470 filed Jul. 10, 2017.

FIELD OF THE INVENTION

This invention relates to a system that prevents fouling and contamination of marine or otherwise submerged hydraulic cylinders and, more particularly, to an anti-fouling system for use with submerged hydraulic cylinders employed in a boat lift.

BACKGROUND OF THE INVENTION

Hydraulic cylinders are commonly utilized in underwater, muddy or other fully or partially submerged environments. Such mechanisms are featured, for example, on marine pumps, submerged lifts and particularly boat lifts. In such situations, the cylinder mechanism is apt to become fouled or contaminated due to dirt, debris, marine growth, minerals and other contaminants collecting on the cylinder rod. Over time, this debris can be gradually pulled into the cylinder, which can eventually interfere with operation of the mechanism. As a result, such cylinders typically require periodic cleaning, repair and/or replacement. This can be time consuming and expensive and is likely to interrupt use of the hydraulic cylinder mechanism.

Conventionally, a collapsible boot or bellows element has provided the most common form of protection for a submerged hydraulic cylinder rod. Unfortunately, in underwater environments, such boots do not operate in an optimally effective manner. Unless the submerged boot is vented, it will tend to implode as the cylinder rod extends due to the density of the water and its resistance to being sucked into the expanding boot. Conversely, when the cylinder rod retracts and the boot collapses, water previously trapped within the boot causes the boot to balloon. Such constant and repeated imploding and ballooning of the boot can cause the boot to prematurely deteriorate and eventually fail. The protective bellows elements have thus been vented to facilitate drawing the water into the boot. However, this tends to introduce a considerable amount of contaminants into the bellows element, which eventually collect on and interfere with operation of the cylinder rod.

In an attempt to overcome the foregoing problems, U.S. Pat. No. 8,291,810 has added a flapper valve across the boot vent. The valve opens to suck water into the boot as the boot expands and subsequently opens to exhaust water from the boot when the cylinder rod retracts and the boot collapses. This permits water to flow into and out of the bellows element as the cylinder operates. The flapper valve therefore reduces the previously described problem of the alternating imploding and ballooning of the boot somewhat. However, water and accompanying minerals, dirt and debris continue to collect on and contaminate the hydraulic cylinder, which can damage the submerged cylinder over extended periods of time. In order to reduce the contaminants that inevitably foul the cylinder rod, U.S. Pat. No. 8,291,810 also employs a series of scrubbers, which complicate the construction and increase the expense of the protective bellows element considerably.

SUMMARY OF THE INVENTION

It is therefore an object of the present invention to provide a system cylinder, which largely, if not entirely eliminates the introduction of water into the protective boot or bellows element of a submerged hydraulic cylinder and which thereby significantly reduces marine contamination of the cylinder and the cylinder connecting rod.

It is a further object of this invention to provide a fouling prevention system for submerged hydraulic cylinders, which uniquely introduces filtered air into the hydraulic cylinder bellows element so that contaminants such as dirt, mud, minerals and marine life are effectively prevented from entering the protective boot or bellows element of the hydraulic cylinder, collecting on the cylinder rod and thereby interfering with proper operation of the cylinder mechanism.

It is a further object of this invention to provide a fouling prevention system for a submerged hydraulic cylinder mechanism, which employs a simpler and more reliable construction and operation than is utilized by conventional devices.

It is a further object of this invention to provide a fouling prevention system, which may be used effectively on hydraulic cylinders used for marine lifts and other underwater applications.

It is a further object of this invention to provide a system for extending the working life of a submerged hydraulic cylinder and reducing the aggravation, cost and interruptions currently involved with having to maintain or replace contaminated underwater cylinders.

This invention features a fouling prevention system for a submerged hydraulic cylinder mechanism wherein the mechanism includes a cylinder housing and a cylinder rod that is movably mounted in the cylinder housing for reciprocating between extended and retracted conditions. Hydraulic fluid is selectively introduced into and removed from the cylinder housing to drive the cylinder rod between the extended and retracted conditions. The fouling prevention system includes a bellows element for interconnecting between the cylinder housing and the cylinder rod. The bellows element is alternatable between a collapsed condition when the rod is retracted within the cylinder housing and an expanded condition when the rod is extended from the cylinder housing. A pneumatic line is communicatively connected to the bellows element and a distal end of the pneumatic line is open to the atmosphere. The hydraulic cylinder mechanism and attached bellows element are submerged and hydraulic pressure is applied to the cylinder mechanism to selectively extend the cylinder rod from the cylinder housing, which causes the bellows element to expand, and retract the cylinder rod relative to the cylinder housing, which causes the bellows element to collapse. As the bellows element expands, air is drawn into the pneumatic line and delivered to the interior of the bellows element. When the cylinder rod retracts and the bellows element collapses, air is pushed out of the bellows and through the pneumatic line. The air is then discharged from the distal end of the line into the atmosphere.

In a preferred embodiment, the pneumatic line is connected proximate an upper end of the bellows element by a pneumatic fitting. The opposite end of the pneumatic line may be communicably attached to a filter for filtering air that is drawn into the bellows element through the pneumatic line when the bellows element expands.

A pair of hydraulic lines may be operatively connected to the cylinder housing proximate upper and lower ends of the cylinder housing respectively. Hydraulic fluid is applied selectively through the hydraulic lines to drive the cylinder rod between the extended and retracted conditions. A control box mounted above the waterline may accommodate a hydraulic fluid reservoir that is operatively interconnected by a hydraulic pump to the hydraulic lines. The control box may also hold an air filter that is connected to a distal end of the pneumatic line for filtering air that is drawn into the bellows element through the pneumatic line. The hydraulic and pneumatic lines may be transmitted through a hose or other protective conduit that extends between the hydraulic cylinder and the control box. A pump contained in the control box and operatively connected to the reservoir directs the hydraulic fluid through the upper and lower hydraulic lines to selectively extend or retract the connecting rod relative to the hydraulic cylinder. A remote controlled transmitter may be employed to operate the hydraulic pump to transmit hydraulic fluid between the fluid reservoir and the hydraulic cylinder such that the hydraulic cylinder is selectively alternated between the retracted and extended conditions.

The fouling prevention system may be used in conjunction with one or more hydraulic cylinders employed in a boat lift or other underwater application. In particular, each hydraulic cylinder may be operatively connected to the structural components of a marine or boat lift such that the hydraulic cylinder is submerged during at least a portion of its operation. The anti-fouling system may be utilized for preventing cylinder contamination of a single actuator or multiple cylinder mechanisms.

BRIEF DESCRIPTION OF THE DRAWINGS

Other objects, features and advantages will occur from the following description of a preferred embodiments and the accompanying drawings, in which.

DETAILED DESCRIPTION OF PREFERRED EMBODIMENTS

Figure 1:
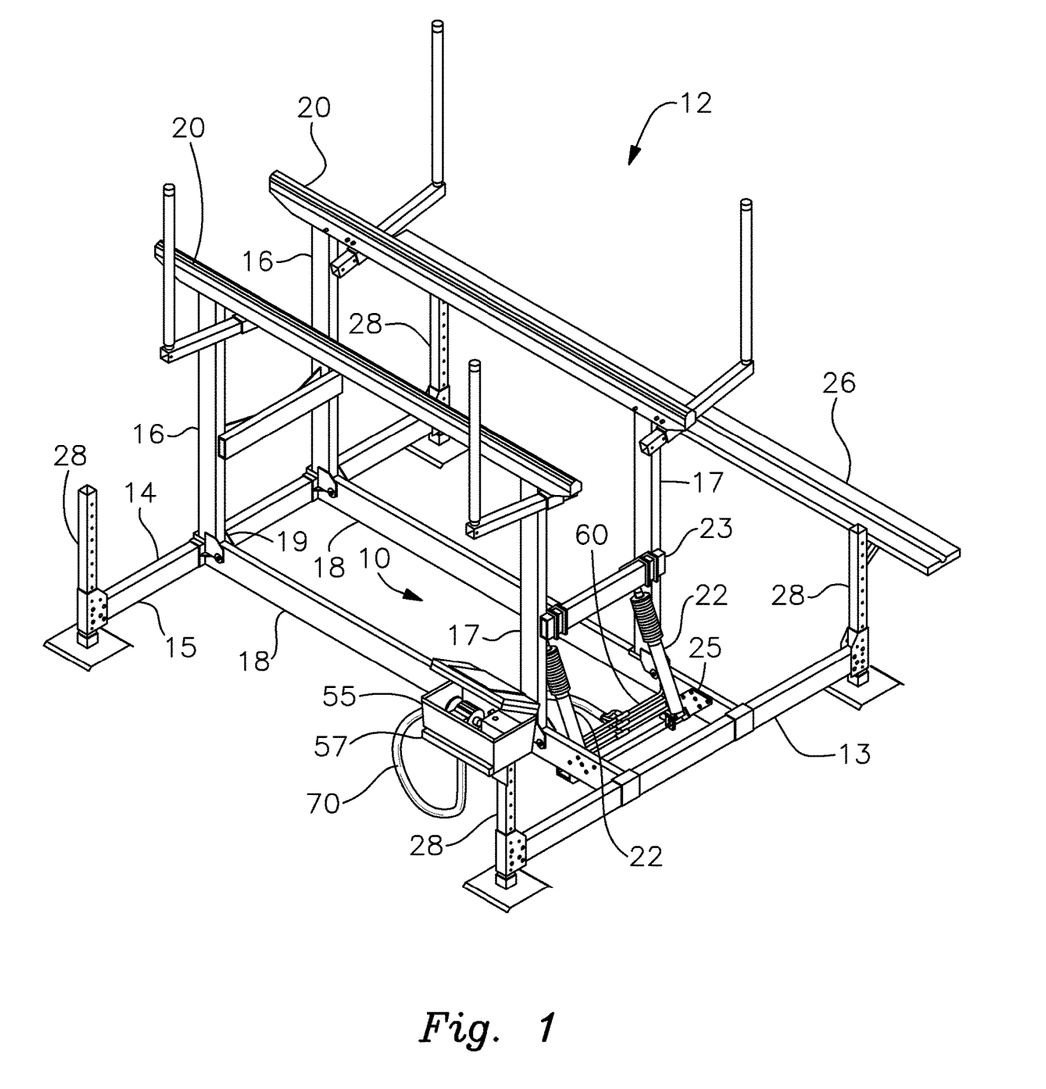
FIG. 1 is a perspective, partly fragmentary view of a hydraulically operated boat lift that employs the system of this invention to prevent fouling of the submerged hydraulic cylinder actuator mechanisms.

There is shown in FIG. 1 a fouling prevention system 10 that is incorporated in a hydraulically operated aluminum boat lift 12 in accordance with this invention. The boat lift features a supportive framework 14 that is positioned in a body of water, not shown. Framework 14 is adjustably mounted on supportive stanchions 28, which are themselves mounted on the bottom or floor of the body of water. The framework may be adjusted vertically along stanchions 28 so that the height of boat lift 12 within the body of water may be set as required for a particular vessel.

Framework 14 includes a pair of generally parallel longitudinal beams 18. These beams extend between forward and rearward transverse beams 13 and 15, where are themselves mounted to and height adjustable along stanchions 28. A first pair of posts 16 are pivotally mounted at their lower ends to respective longitudinal beams 18 proximate one end of framework 14. An opposite second pair of posts 17 are likewise pivotally connected at their lower ends to respective longitudinal beams 18 proximate the opposite end of framework 14. A pair of generally parallel cradle beams 20 are pivotally connected to the upper ends of the support posts such that each cradle beam 20 extends between a respective pair of posts 16 and 17. The lower end of each post 16, 17 is pivotally secured to a respective lower longitudinal beam 18 by a respective pivot bracket 19.

Figure 3:
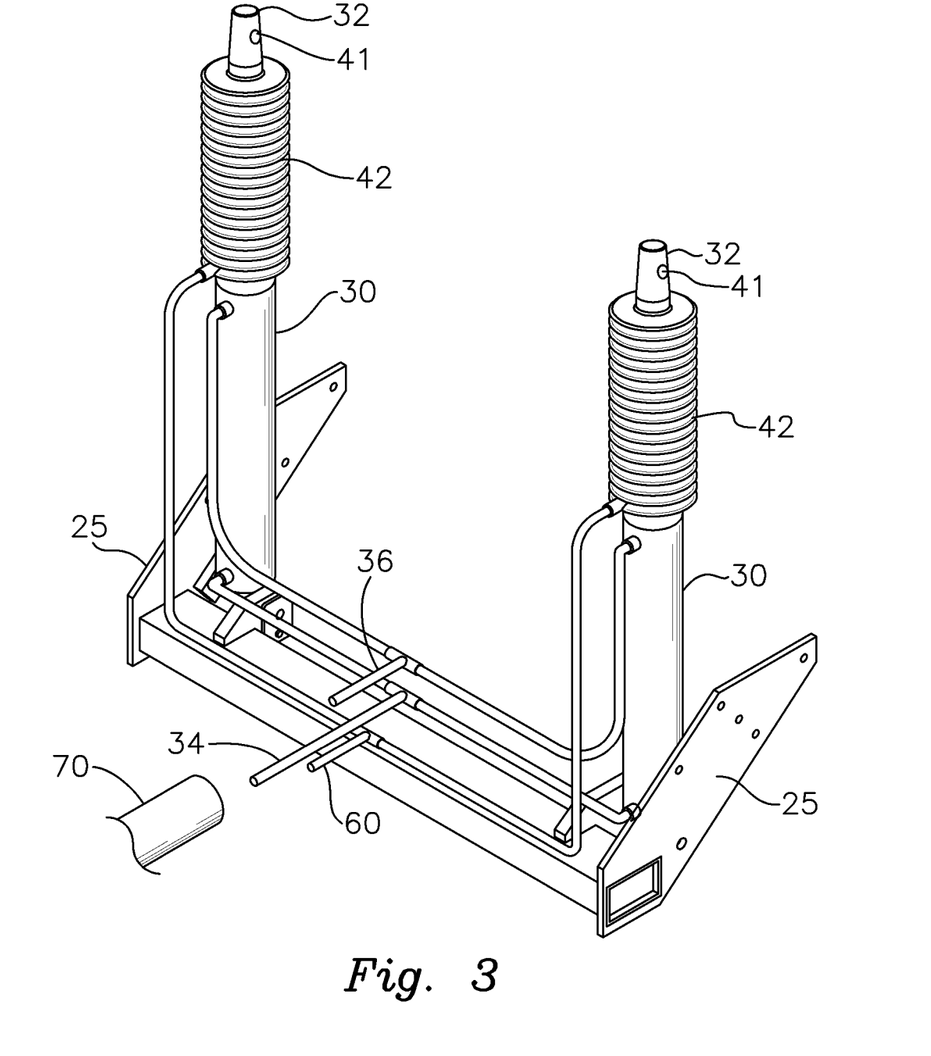
FIG. 3 is a fragmentary perspective view of a pair of hydraulic cylinder actuators employed in the boat lift with pneumatic and hydraulic lines connected thereto.
Figure 3A:
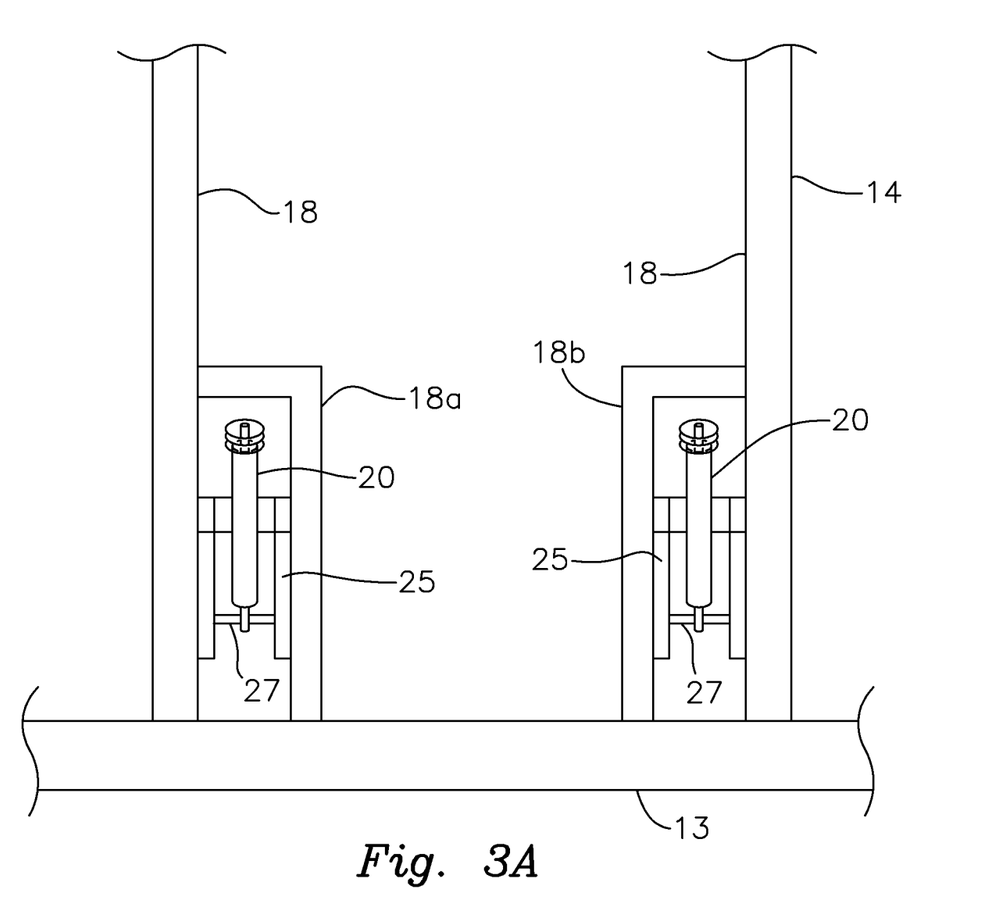
FIG. 3A is a fragmentary top view of the lift specifically showing an alternative structure for operatively mounting the hydraulic actuators to the framework of the lift.

The pivoting support posts 16, 17 and cradle beams 20 supported by the support posts 16, 17 are selectively raised and lowered by a pair of hydraulic cylindrical actuators 22. Each actuator is interconnected between a respective bracket assembly 25 (shown more fully in FIG. 3) and a transverse beam 23 interconnecting posts 17. Brackets 25 are themselves attached to and comprise a part of the framework of the lift. As depicted in FIGS. 3, 3A, the lower end of each actuator 22 is pivotably connected to a respective bracket 25 by an actuator pivot 27. Brackets 25 are themselves bolted or otherwise fixed to framework 14, and more particularly, to respective beams 18. In the alternative version shown in FIG. 3A brackets 25a are attached to respective beams 18 and L-shaped support beams 18a, 18b, which are themselves interconnected between transverse beam 13 and respective longitudinal beams 18.

It should be understood that boat lift 12 may also include a number of other conventional boat lift components. For example, as further shown in FIG. 2, vertical guides 24 may be mounted to and extend upwardly from cradle beams 20. Guides 24 help to properly position the boat B onto boat lift 12. An optional walkway 26 may likewise be mounted upon framework 14 to facilitate boarding and departure onto and from the vessel respectively. It should be understood that the above-described boat lift construction is largely conventional.

Figure 4:
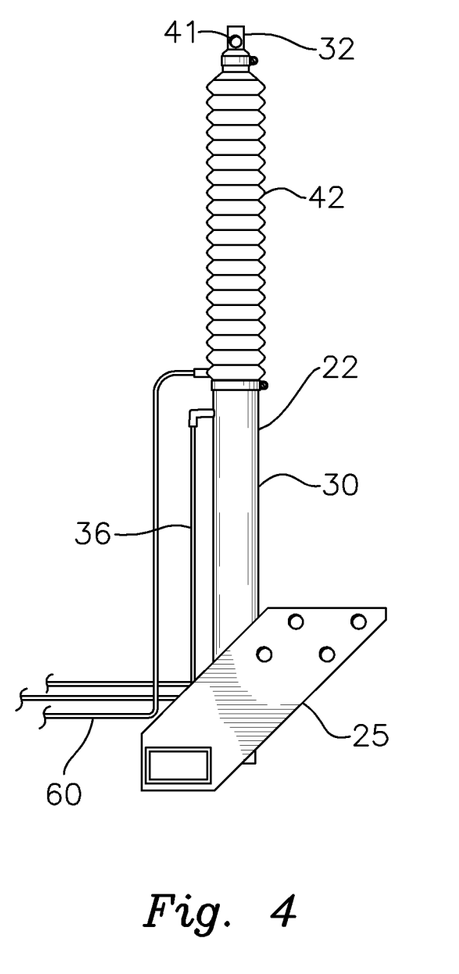
FIG. 4 is a elevational side view of a single one of the hydraulic cylinders and specifically depicting an upper one of the hydraulic lines connected to the cylinder housing and the pneumatic line communicably connected to an upper end of the protective bellows.
Figure 5:
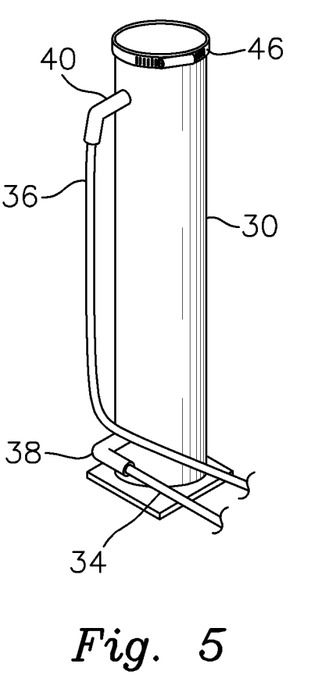
FIG. 5 is a perspective view of the cylinder housing with the pair of hydraulic lines operatively connected thereto.

Boat lift 12 is operated hydraulically. In particular, the support posts 16, 17 and cradle beams 20 of the lift are selectively raised and lowered by a spaced apart pair of hydraulic cylinder actuators 22, which are best depicted in FIG. 3. A single representative actuator 22 is shown in FIG. 4. The underlying hydraulic actuator itself employs a conventional construction. In particular, each actuator 22 includes an elongate hydraulic cylinder housing 30, which is shown alone in FIG. 5. A cylinder rod 32 is operatively interengaged with cylinder housing 30 in a conventional manner that will be understood to persons skilled in the field of hydraulic cylinders. More particularly, cylinder rod 32 is attached to an internal piston (hidden from view) that is mounted for sliding in a reciprocating manner within cylinder housing 30. As best shown in FIGS. 3 and 5, a pair of lower and upper hydraulic lines 34, 36 comprising tubes or pipes, which operatively transmit hydraulic fluid therethrough, are communicably connected to the interior of each hydraulic cylinder housing 30 through respective lower and upper hydraulic fittings 38 and 40. The hydraulic lines are run through holes in mounting brackets 25. Hydraulic fluid is transmitted through lines 34 and 36 to actuator mechanisms 22 from a hydraulic fluid reservoir contained within a control box 55 shown in FIG. 1. Box 55 is mounted on a platform 57 supported at the top of one of the boat lift stanchions 28 of boat lift 12. Stanchion 57 should be sufficiently tall and platform 57 sufficiently elevated such that box 55 is supported above the water level at all times. The hydraulic lines extend through a protective conduit 70, which is described more fully below.

Each cylinder rod 32 extends upwardly from cylinder 30 in a standard manner. A mounting hole 41 is formed through rod 32 proximate an upper end of the rod. This allows the upper end of the actuator mechanism to be operatively connected to the boat lift in the manner described below.

Figure 6:
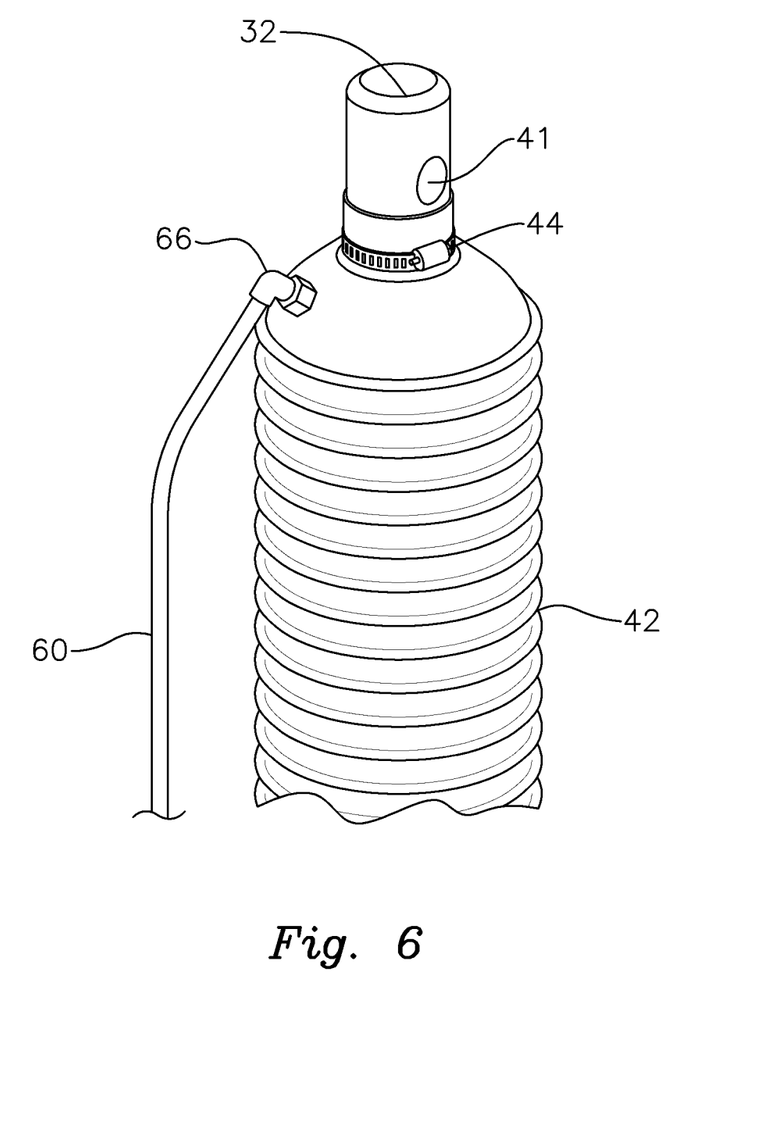
FIG. 6 is a perspective view of the protective bellows element with the pneumatic line operatively connected thereto.

As known in the prior art, a selectively collapsible and expandable boot or bellows element 42 is attached to each actuator 22. Bellows element 42 is composed of a durable, water-tight, flexible and/or elastomeric material. An upper end of bellows element 42 is fastened to cylinder rod by a hose clamp 44, as best illustrated in FIG. 6. Similarly, a lower end of bellows element 42 is secured by a hose clamp 46 in the manner shown, for example, in FIG. 5. Hose clamps 44 and 46 are tightened sufficiently to prevent water intrusion into the interior of bellows element 42 through the upper and lower ends of the bellows element respectively. The bellows element thereby encloses and protectively covers most of the exposed length of cylinder rod 32.

Figure 2:
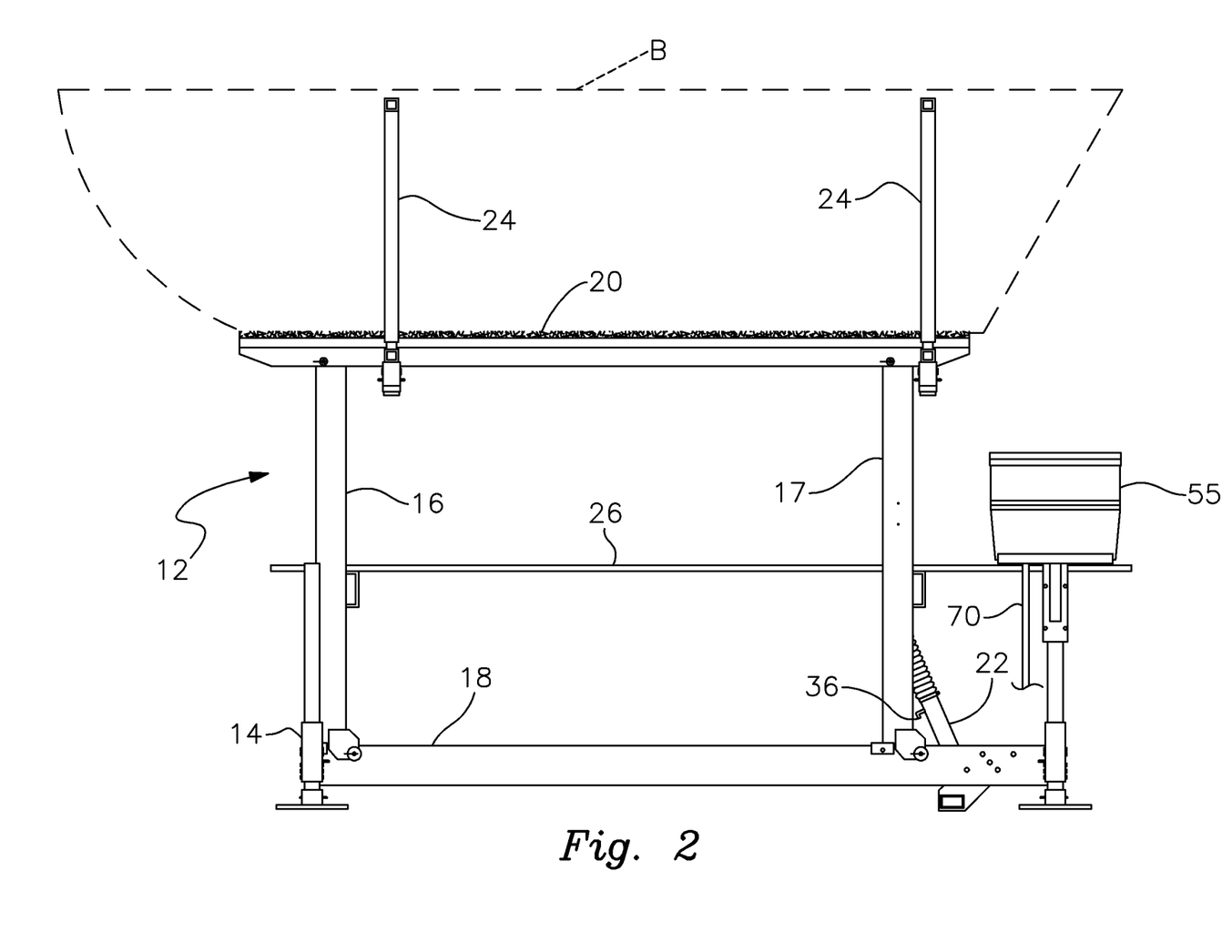
FIG. 2 is an elevational side view of the boat lift utilizing the fouling prevention system.

As shown in FIGS. 1 and 2, actuators 22 are operatively incorporated into boat lift 12 to hydraulically raise and lower the boat lift. As depicted more specifically in FIGS. 3-5, the lower end of each cylinder housing 30 is pivotally attached to a respective mounting bracket 25 (for example by pivots 27, FIG. 3A). The bracket is, in turn, secured by bolts to framework 14 of the boat lift. The particular means for pivotally mounting the lower ends of the hydraulic cylinder actuators is not a critical feature of the present invention. Various alternative support brackets, pivots and other structural pieces may be utilized for accomplishing this purpose.

The upper end of each actuator is likewise pivotally connected to an upper cross beam 23 (FIG. 1) extending between respective posts 17 of boat lift 12. For example, the upper end of cylinder rod 32 may fit between a respective pair of spaced apart flanges (not shown) depending from beam 23. A pivot pin, not shown, may be inserted through the aligned holes in these flanges and the opening 41 in rod 32 to thereby pivotally interconnect the hydraulic actuator mechanism to cross-beam 23.

A critical feature of system 10 is the introduction of filtered air into and the discharge of such air from bellows elements 42 during hydraulic operation of lift 12. This is accomplished through a pneumatic line 60 (FIGS. 3, 4 and 6), which may comprise a hose, tube or pipe extending between actuators 22 and the control box 55, FIG. 1, supported by a lift stanchion 28 above the waterline. As best shown in FIG. 3, pneumatic line 60 includes discrete, diverging segments communicably connected to the respective bellows. As represented in FIG. 6, each segment of line 60 may also be communicably connected through a pneumatic fitting 66 to the interior of a respective bellows element 42 attached proximate an upper end of the bellows. Line 60 extends through the protective conduit 70, FIGS. 1, 3, 7, and 8, which also transmits hydraulic lines 34 and 36.

Conduit 70 may comprise a hose, tube or pipe, which is durable and resists deterioration in a submerged marine environment.

Figure 8:
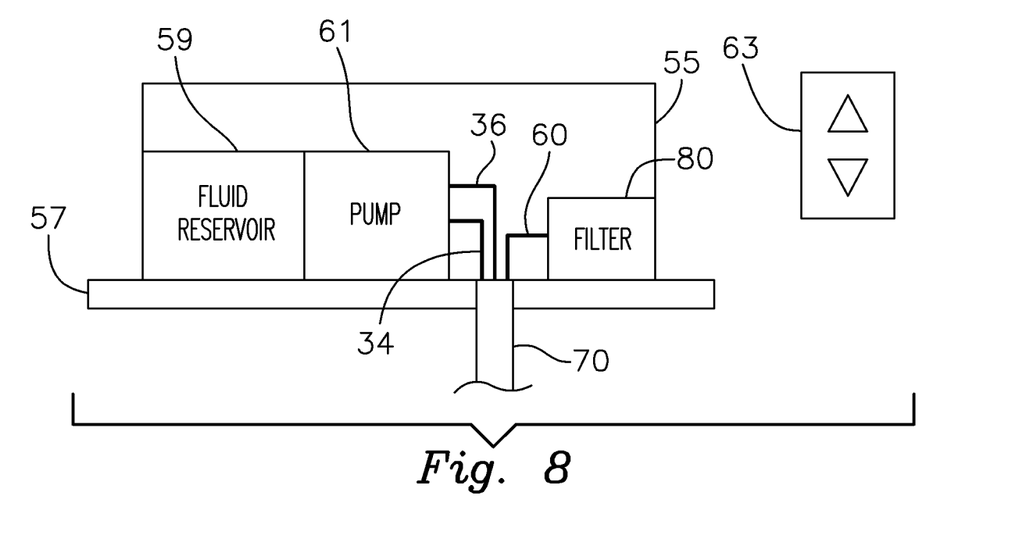
FIG. 8 is a schematic view of the control box, particularly depicting the hydraulic fluid reservoir and pump, as well as the air filter housed therein.

As depicted schematically in FIG. 8, box 55 contains a hydraulic fluid reservoir 59 that is operatively connected to a hydraulic pump 61. The pump is operatively connected to a wireless receiver and microcontroller (not shown) which in turn are operated by a remote control transmitter 63. Signals from transmitter 63 direct pump 61 to transmit hydraulic fluid through lines 34 and 36, which in turn operates hydraulic cylinder actuators 22 to selectively extend and retract respective cylinder rods 32 relative to cylinder housings 30. This, in turn, respectively raises and lowers the boat lift. As indicated, hydraulic lines 34 and 36 extend through protective conduit 70 from control box 55 to each actuator mechanism 30. The hydraulic lines split into respective branch segments upon exiting conduit 70 with line 34 communicably connecting to the lower portion of each cylinder housing 30 (below the piston) and the line 36 communicably attaching to an upper portion of each cylinder housing (above the piston).

Figure 7:
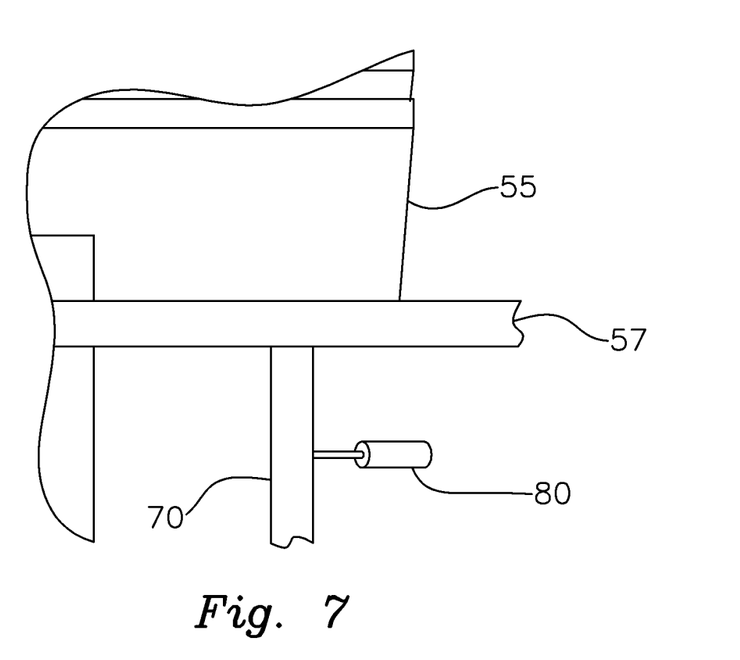
FIG. 7 is an elevational side view of the control box for the fouling prevention system, which box is mounted on a structural component of a boat lift with the protective conduit that accommodates the hydraulic and pneumatic lines joined thereto through a structural component of the boat lift.

As best shown in FIGS. 7 and 8, pneumatic line 60 extends through protective conduit 70 and enters control box 55. A distal end portion of the pneumatic line (for example comprising a common inlet and outlet port) is communicably connected to an air filter 80. This filter acts to filter exterior air drawn into the bellows from the ambient atmosphere or other exterior air source during operation of the hydraulic cylinder as described below.

In operation, the hydraulic cylinder actuators typically remain submerged below the water line, at least when boat lift 12 is in the lowered condition. Water-tight bellows elements 42 thereby restrict water from intruding into the bellows elements and contaminating the respective cylinders and cylinder rods.

Boat lift 12 is raised by actuating remote control transmitter 63. This causes pump 61 to direct hydraulic fluid through lines 34 and 36 such that cylinder rods 32 are extended from respective cylinder housings 30 and bellow elements 42 are expanded. Expansion of bellow elements 42 causes outside ambient air to be drawn into the bellows elements through pneumatic line 60 and respective segments of the pneumatic line. This air is drawn through filter 80 within box 55 so that each extended cylinder rod is enclosed and surrounded by filtered air within its respective extended bellows element. Water and accompanying dirt, debris, minerals, barnacles and other contaminants are thus largely, if not entirely prevented from intruding into the bellows elements, collecting on the cylindrical rods, and adversely affecting operation of the actuators. In addition, air is introduced into the bellows elements much more easily and with less resistance than is exhibited when water is pumped into the bellows elements as in the prior art. As a result, the bellows elements resist implosion, which commonly occurs when water is drawn into the bellows elements during the lifting operation. Although the filtered air is preferably collected from the surrounding atmosphere, in alternative embodiments it can be provided by air tanks or other sources of air.

When the lift needs to be lowered, the operator actuates the remote control transmitter to reverse the flow of hydraulic fluid to and from the actuator mechanisms 22. As a result, cylinder rods 32 are retracted within their respective cylinder housings 30. The bellows elements 42 are thereby collapsed and the filtered air previously drawn into the bellows is expelled through pneumatic conduit 60 and into the atmosphere. Air is discharged from the bellows elements in this manner much more easily than water is discharged as in the prior art. This prevents the bellows from ballooning as the lift is lowered. System 10 therefore eliminates successive imploding and ballooning of the bellows during operation of the hydraulic cylinder actuators, which reduces stress upon and prolongs the working life of the bellows elements as well as the hydraulic cylinder actuators themselves.

The fouling prevention system of the present invention significantly and effectively restricts water intrusion into the protective boot or bellows of a submerged hydraulic cylinder actuator employed for a marine lift or otherwise, not only when the actuator is inactive, but also during the lifting (cylinder extension) and lowering (cylinder retraction) operations. This significantly reduces contamination and fouling of the hydraulic cylinder and cylinder rod. As a result, marine lift actuators and other submerged hydraulic cylinder operated marine mechanisms do not have to be repaired and/or replaced as frequently as in the past. Maintenance expenses are reduced and more prolonged and reliable hydraulic cylinder operation is achieved. It should be understood that the anti-fouling system of the present invention may be employed effectively both for marine lifts and in various alternative environments and applications wherein submerged hydraulic cylinder actuating mechanisms are employed.

From the foregoing it may be seen that the apparatus of this invention provides for a system that utilizes filtered air to prevent fouling and contamination of submerged hydraulic cylinder actuator mechanisms in boat lifts and other underwater applications. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A fouling prevention system for a submerged hydraulic cylinder actuator, wherein the cylinder actuator includes a cylinder housing and a cylinder rod movably mounted in the cylinder housing for reciprocating between extended and retracted conditions and wherein hydraulic fluid is selectively introduced into and removed from the cylinder housing to drive the cylinder rod between the extended and retracted conditions; said fouling prevention system comprising:
   a bellows element for interconnecting the cylinder housing and the cylinder rod; and
   a pneumatic line communicatively connected with an interior of said bellows element and having a distal portion for communicating with a source of air exterior to said bellows element;
   said bellows element being responsive to extension of the cylinder rod from the cylinder housing for expanding to draw exterior air through said pneumatic line into said interior of said bellows element, and said bellows element being further responsive to retraction of the cylinder rod within the cylinder housing for collapsing to discharge air from said interior of said bellows element through said pneumatic line, whereby water intrusion into said interior of said bellows element is restricted and contamination of the hydraulic cylinder actuator is reduced.

2. The system of claim 1 in which said pneumatic line is communicatively connected proximate an upper end of said bellows element.

3. The system of claim 2 in which said pneumatic line is interconnected to said bellows element by a pneumatic fitting.

4. The system of claim 1 in which said distal portion of said pneumatic line is communicatively attached to a filter for filtering the air drawn into said interior of said bellows element through said pneumatic line when said bellows element expands.

5. The system of claim 4 in which a pair of hydraulic lines are operatively connected to the cylinder housing proximate the upper and lower ends respectively of the cylinder housing and hydraulic fluid is applied selectively through the hydraulic lines to drive the cylinder rod between the extended and retracted conditions, said system further comprising a non-submerged control box, which accommodates a hydraulic fluid reservoir operatively interconnected by a hydraulic pump in said control box to the hydraulic lines; said control box further holding said filter.

6. The system of claim 5 in which said hydraulic lines and said pneumatic line are transmitted through a common protective conduit extending between the hydraulic cylinder actuator and said control box.

7. The system of claim 6 further including said hydraulic pump contained in said control box and operatively connected to the hydraulic fluid reservoir for directing hydraulic fluid through the upper and lower hydraulic lines to selectively extend and retract the cylinder rod relative to the hydraulic cylinder.

8. The system of claim 7 further including a remote control transmitter for operating said hydraulic pump to transmit hydraulic fluid between the hydraulic fluid reservoir and the hydraulic cylinder such that the hydraulic cylinder is selectively operated between the retracted and extended conditions.

9. A fouling prevention system for a submerged hydraulic cylinder actuator used in a marine lift apparatus, wherein the submerged hydraulic cylinder actuator includes a cylinder housing and a cylinder rod movably mounted in the cylinder housing for reciprocating between extended and retracted conditions and wherein hydraulic fluid is selectively introduced into and removed from the cylinder housing to drive the cylinder rod between the extended and retracted conditions; said fouling prevention system comprising:
   a bellows element for interconnecting the cylinder housing and the cylinder rod; and
   a pneumatic line communicatively connected with an interior of said bellows element and having a distal portion for communicating with a source of air exterior to said bellows element;
   said bellows element being responsive to extension of the cylinder rod from the cylinder housing for expanding to draw exterior air through said pneumatic line into said interior of said bellows element, and said bellows element being further responsive to retraction of the cylinder rod within the cylinder housing for collapsing to discharge air from said interior of said bellows element through said pneumatic line, whereby water intrusion into said interior of said bellows element is restricted and contamination of the hydraulic cylinder actuator is reduced.

10. The system of claim 9 in which said pneumatic line is communicatively connected proximate an upper end of said bellows element.

11. The system of claim 10 in which said pneumatic line is interconnected to said bellows element by a pneumatic fitting.

12. The system of claim 9 in which said distal portion of said pneumatic line is communicatively attached to a filter for filtering the air drawn into said interior of said bellows element through said pneumatic line when said bellows element expands.

13. The system of claim 12 in which a pair of hydraulic lines are operatively connected to the cylinder housing proximate the upper and lower ends respectively of the cylinder housing and hydraulic fluid is applied selectively through the hydraulic lines to drive the cylinder rod between the extended and retracted conditions, said system further comprising a non-submerged control box, which accommodates a hydraulic fluid reservoir operatively interconnected by a hydraulic pump in said control box to the hydraulic lines; said control box further holding said filter.

14. The system of claim 13 in which said hydraulic lines and said pneumatic line are transmitted through a common protective conduit extending between the hydraulic cylinder and said control box.

15. The system of claim 14 further including said hydraulic pump contained in said control box and operatively connected to the hydraulic fluid reservoir for directing hydraulic fluid through the upper and lower hydraulic lines to selectively extend or retract the connecting rod relative to the hydraulic cylinder actuator.

16. The system of claim 15 further including a remote control transmitter for operating said hydraulic pump to transmit hydraulic fluid between the hydraulic fluid reservoir and the hydraulic cylinder such that the hydraulic cylinder is selectively operated between the retracted and extended conditions.

* * * * *